Jan. 19, 1960   I. C. MAXWELL ET AL   2,921,726
FOLDING TABLE
Filed Sept. 4, 1956   8 Sheets-Sheet 1
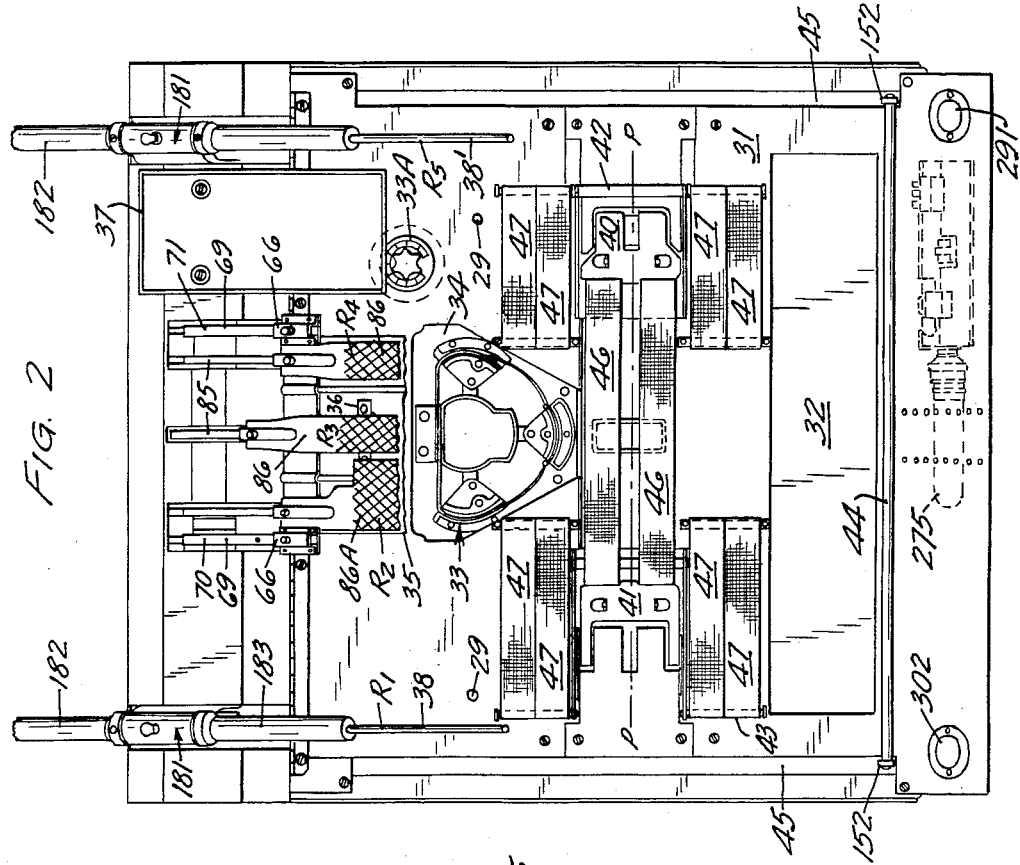
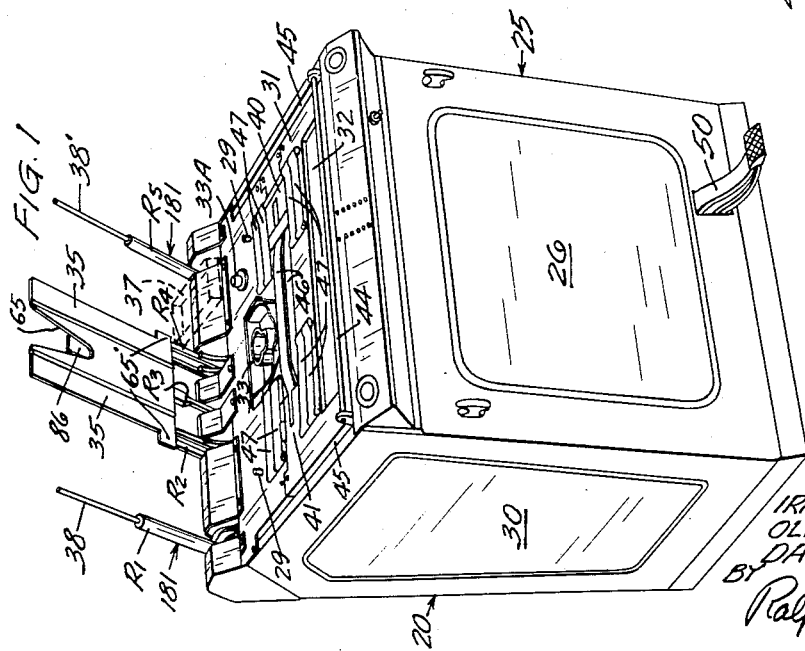
INVENTORS
IRA C. MAXWELL
OLE H. LANGEN
DAN R. PLEHAL
BY Ralph L. Klugger
ATTORNEYS

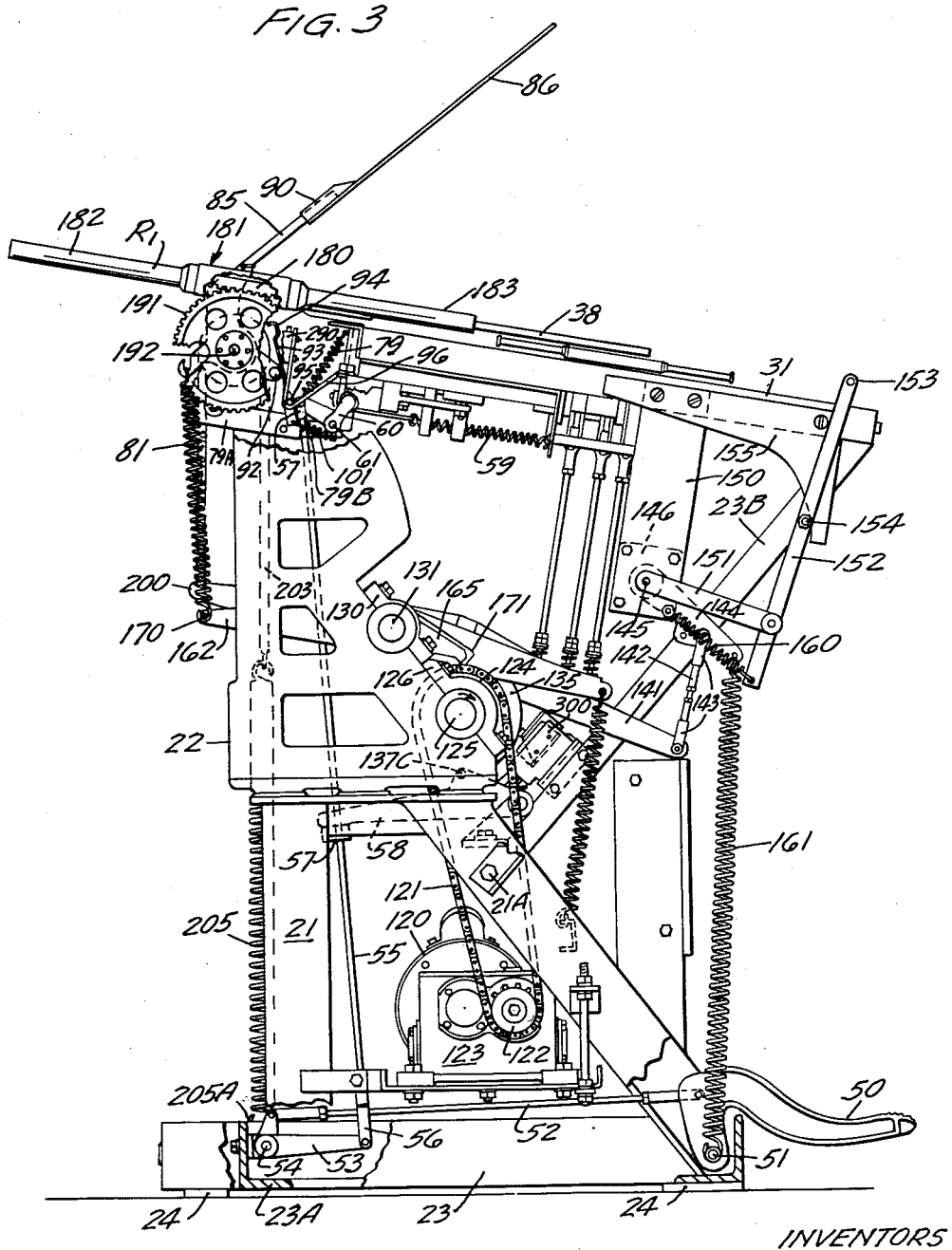

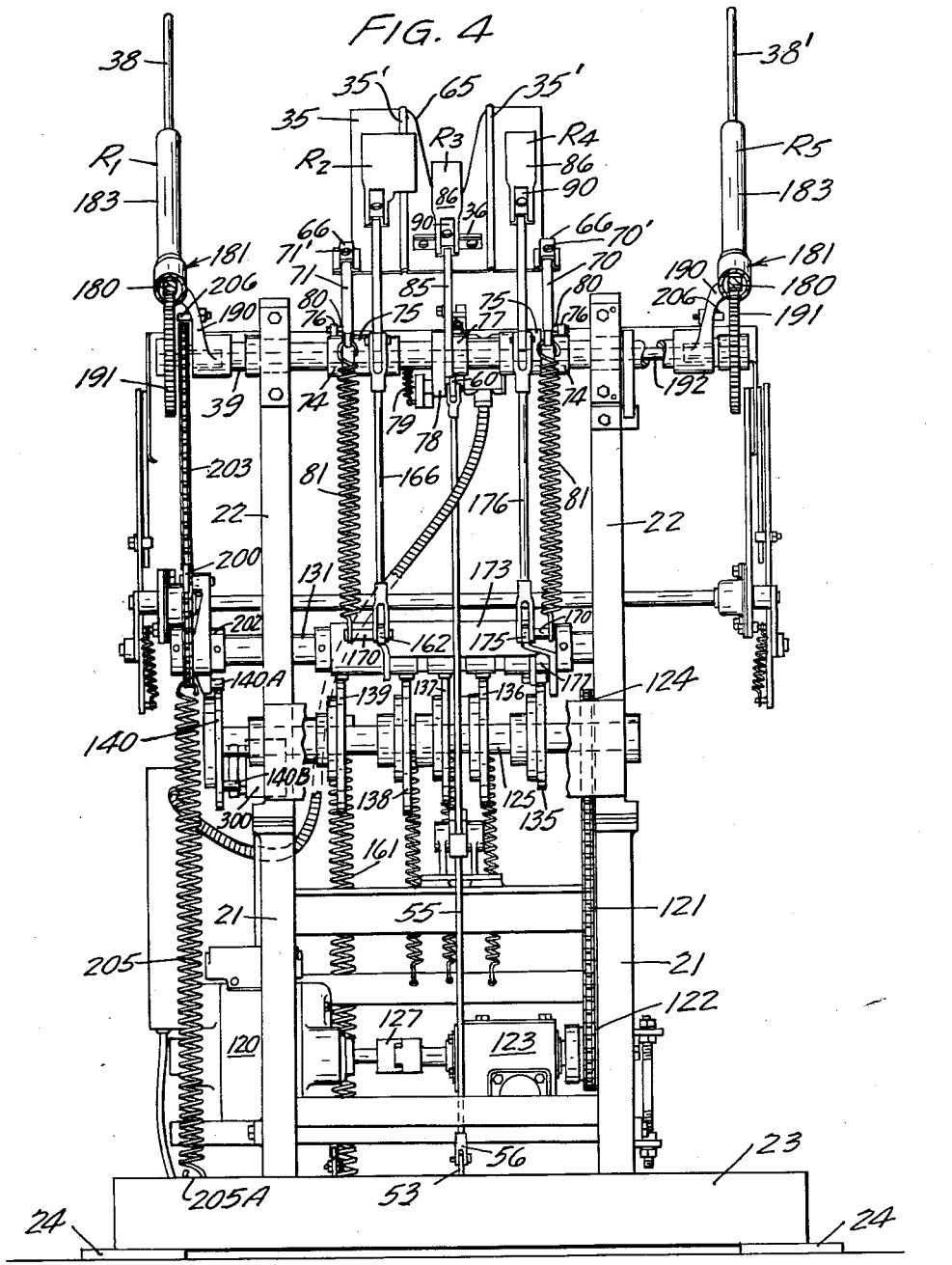

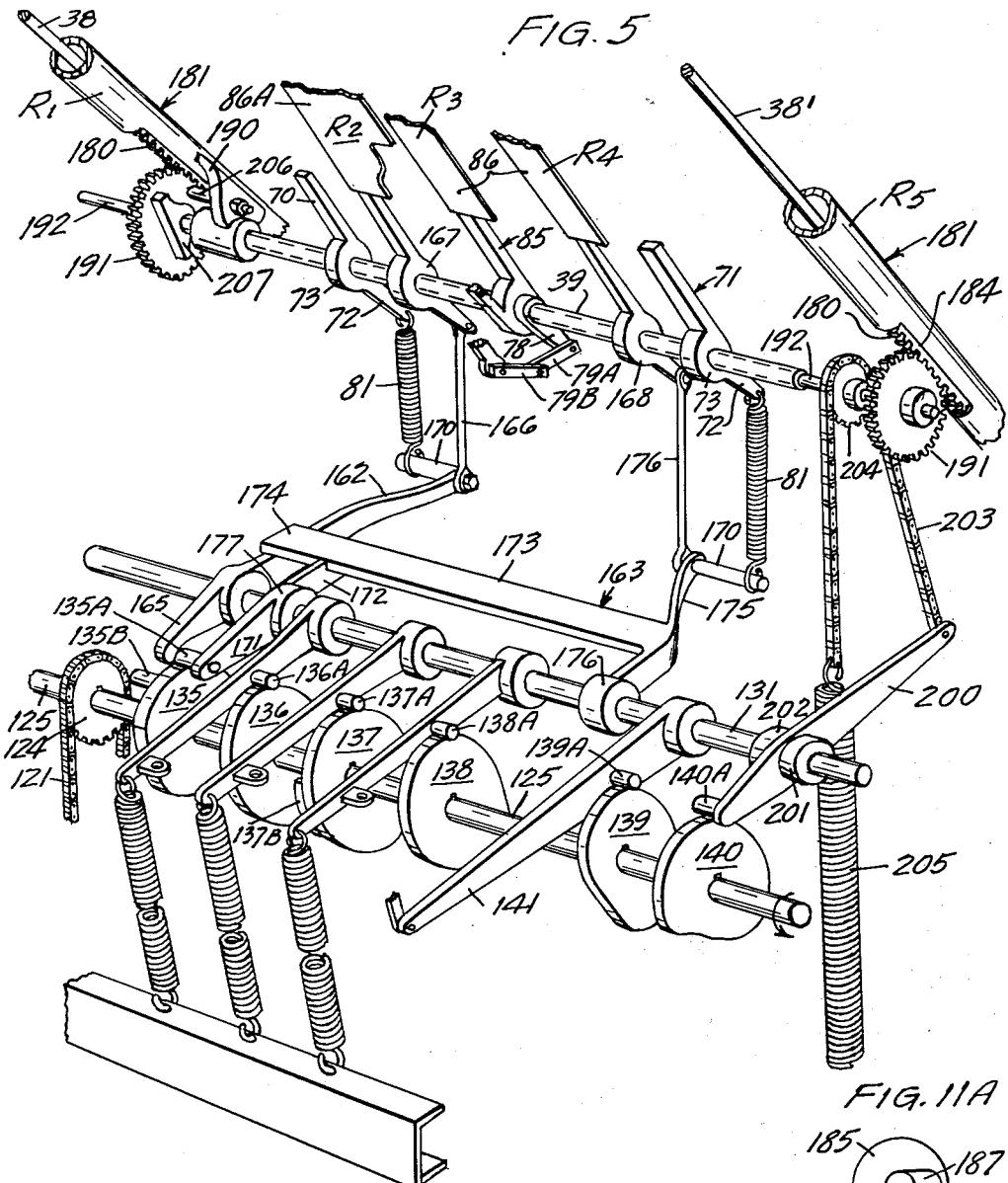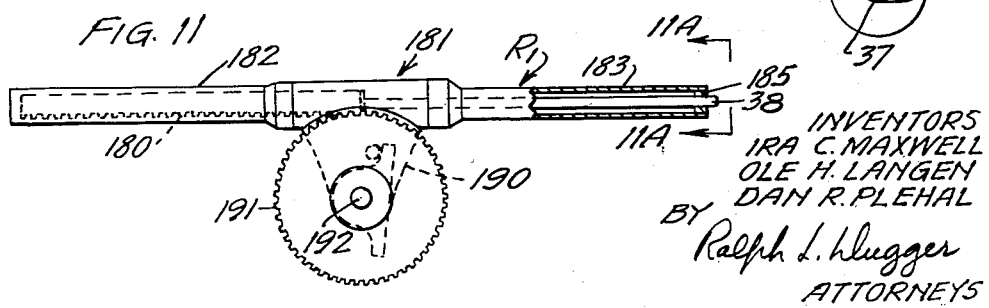

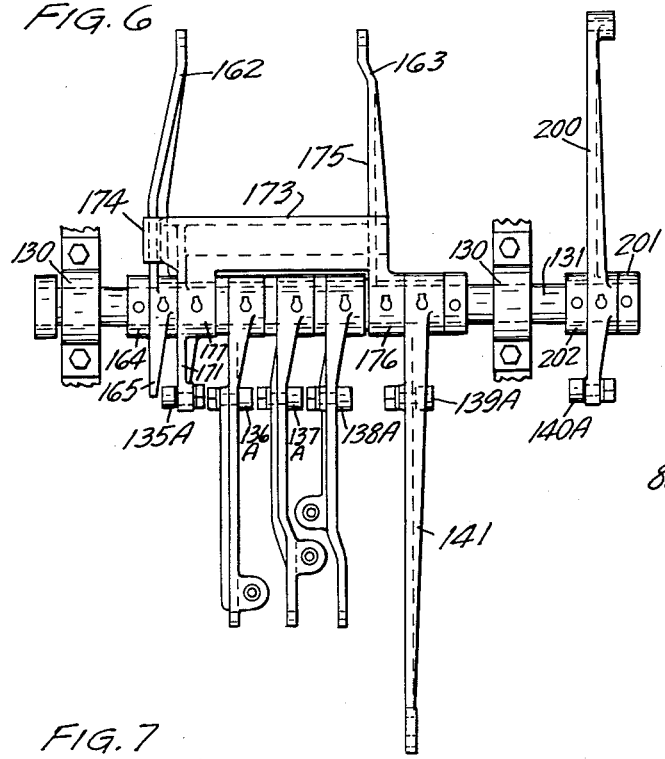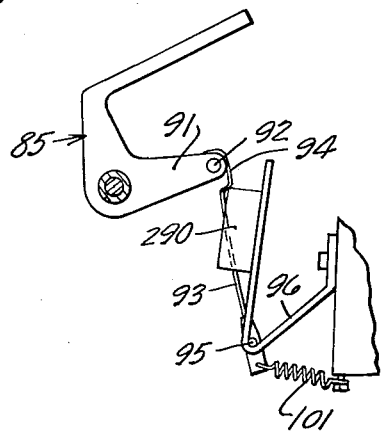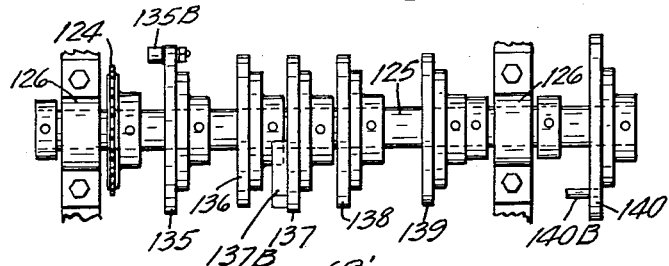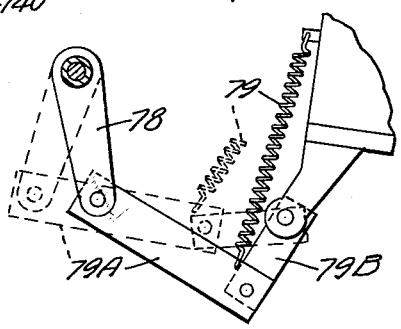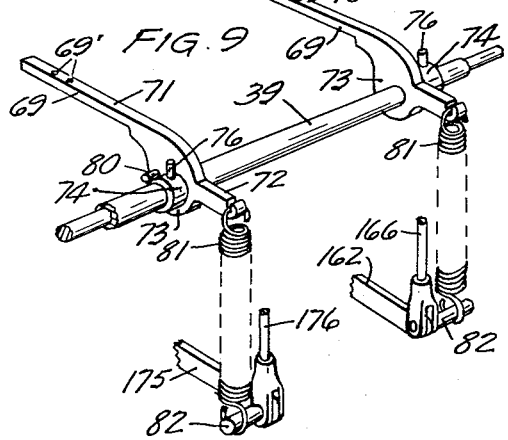

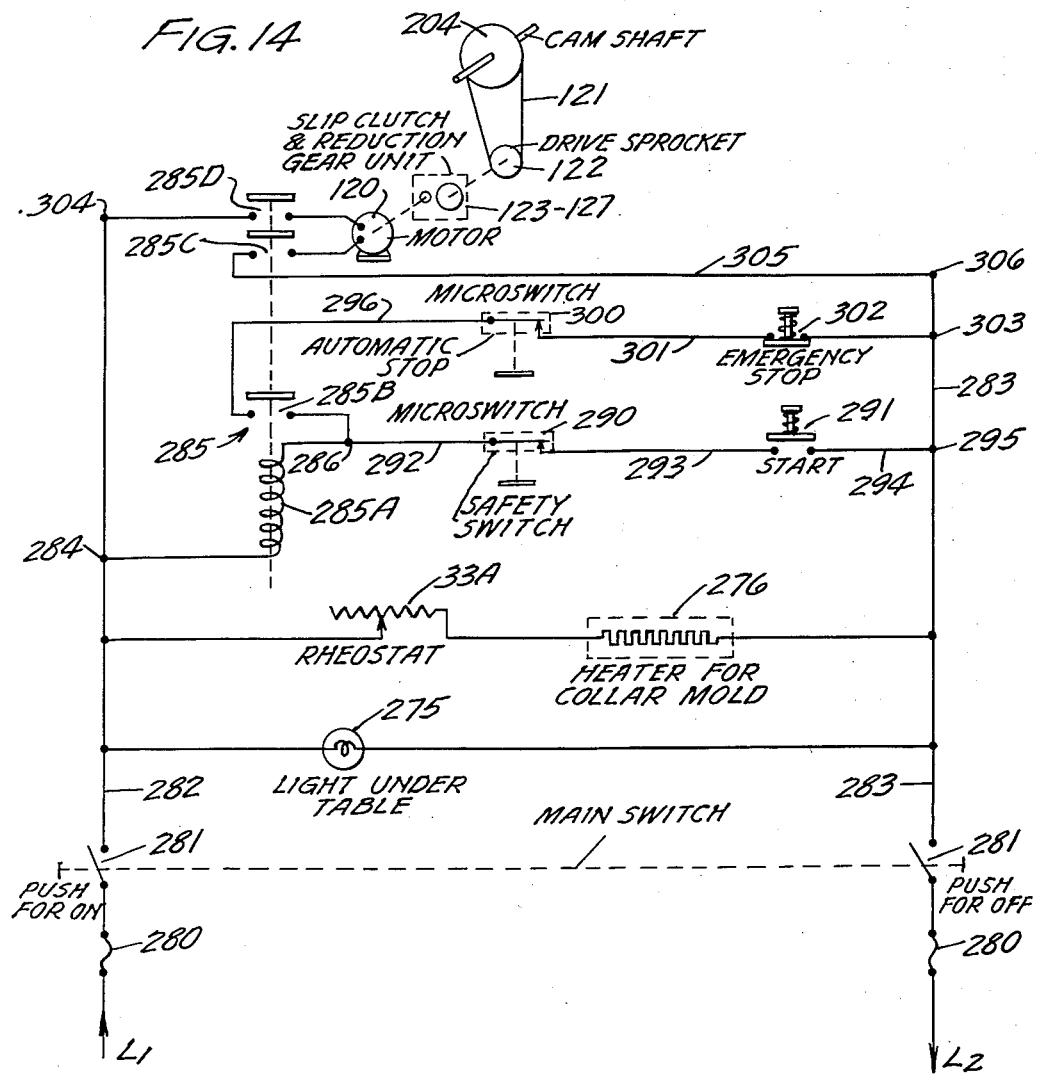

United States Patent Office 2,921,726
Patented Jan. 19, 1960

2,921,726
FOLDING TABLE

Ira C. Maxwell and Ole H. Langen, Minneapolis, and Dan R. Plehal, Robbinsdale, Minn., assignors to The Unipress Company, Incorporated, Minneapolis, Minn., a corporation of Minnesota Application September 4, 1956, Serial No. 607,673

23 Claims. (Cl. 223—37)

This invention relates to new and useful improvements in folding tables for automatically performing a series of operations for folding garments such as shirts and the like into neat uniform packages and the method of folding a garment therewith.

This invention more specifically relates to improvements in automatic shirt folding tables of the type disclosed in Patent No. 2,737,765 and co-pending application Ser. No. 400,258, filed on December 24, 1953, of which this application is a continuation-in-part.

It is an object of this invention to provide new and useful means for automatically providing longitudinal and transverse folds in a shirt in controlled sequence. It is a further object of this invention to provide an improved automatic shirt folding table having means for successively folding the tail of the shirt upwardly, the sides of the shirt inwardly, and for positioning a retaining band around the so folded shirt and then positioning the shirt for easy removal from the table.

Another object of this invention resides in an improved automatic shirt folding table of simple construction for folding a shirt into a neat rectangular package without malfunctioning, and for positioning a retaining band therearound.

It is another object of this invention to provide a new and useful automatic shirt folding table having improved retaining means and improved mechanism for operating this retaining means.

A further object of this invention resides in the improvement in the various retaining means and operating structure thereof.

Still a further object of this invention resides in the use of a planar member or "size plate" in co-operation with a plurality of flexible members including a plurality of extensible and contractible retaining means for retaining the shirt in position on the table.

Still other objects of the invention reside in the construction of the extensible and contractible retaining means, the non-extensible retaining means, the size plate, the co-operation of the size plate with the extensible and nonextensible retaining means, the mechanism for operating the same and in the safety controls.

Other objects of the invention are those inherent and apparent in the apparatus as described, pictured and claimed.

To the accomplishment of the foregoing and related ends, this invention then comprises the features hereinafter more fully described and particularly pointed out in the claims, the following description setting forth in detail certain illustrative embodiments of the invention, these being indicative, however, of but a few of the various ways in which the principles of the invention may be employed.

The invention will be explained with reference to the drawings in which corresponding numerals refer to the same parts and in which:

Fig. 1 is a perspective view of the apparatus of the invention shown from the left forward corner;

Fig. 2 is a top plan view partially broken away showing the apparatus of the invention in starting or initial position;

Fig. 3 is an elevational view with the cover plates of the apparatus removed, taken from the left side;

Fig. 4 is a partially broken away rear elevational view of the arrangement of structure shown in Figure 3;

Fig. 5 is a fragmentary isometric schematic view of the apparatus showing the common cam shaft, common cam follower shaft, common retainer shaft and associated structure separated from the rest of the structure;

Fig. 6 is a top elevation of the common cam follower shaft and associated cam followers;

Fig. 7 is a top elevational view of the common cam shaft and associated cams;

Fig. 8 is a fragmentary elevational view of the supporting structure for one of the supporting retainers, R3;

Fig. 9 is a fragmentary isometric diagrammatic view showing the supporting structure for the size plate;

Fig. 10 is a fragmentary elevational view of the toggle actuator for the retainer shaft, separated from the remainder of the structure;

Fig. 11 is an elevational view of one of the extendable retainers of the instant invention in retracted position;

Fig. 11A is an elevation taken on the line and in the direction of the arrows 11A—11A of Figure 11;

Figure 12:
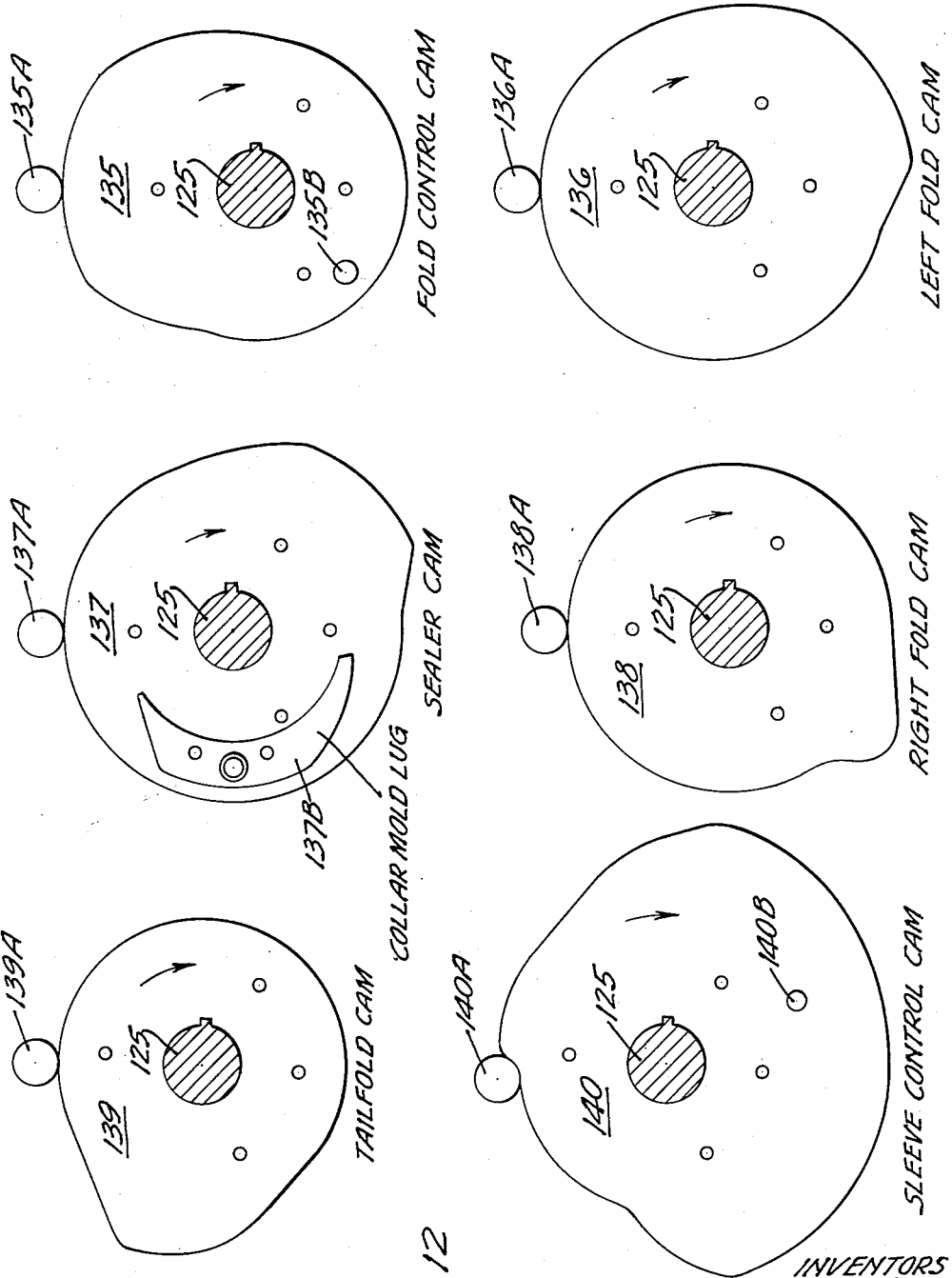
Figure 13:
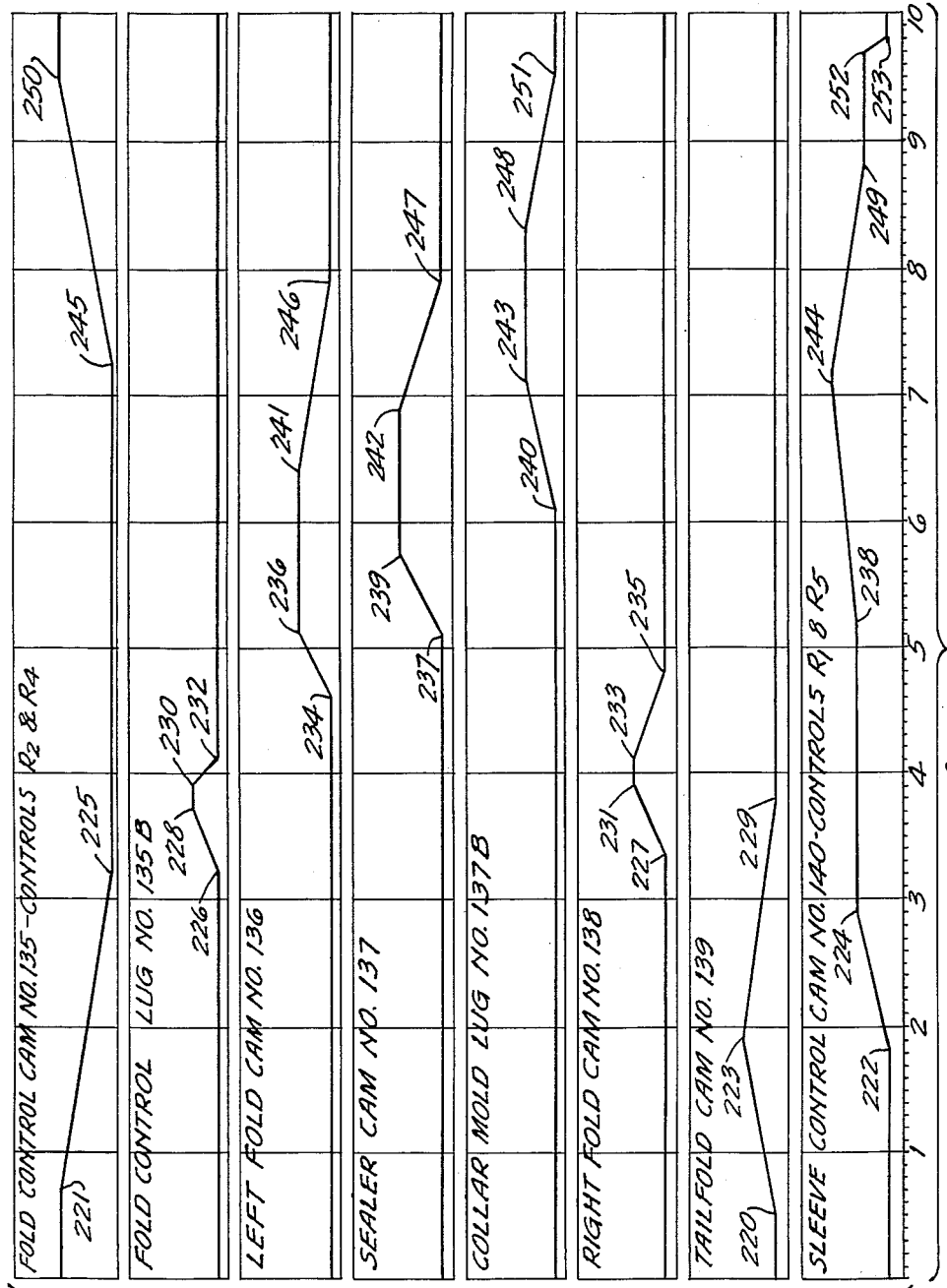

Fig. 12 is a schematic elevational view of the cams and cam follower arrangement shown in Figure 5 separated and side by side. These cams operate the folding mechanism. In this view the drive shaft is shown in section and the cams and followers are shown in the positions they assume at the beginning of the cycle corresponding to the positions of the various structural elements in Figures 1 and 5;

Fig. 13 is a developed plan view of an exemplary form of cam sequence of the present invention for controlling the various mechanisms;

Fig. 14 is a diagrammatic wiring diagram of the electrical circuits and controls of the present invention.

Corresponding numerals refer to the same parts throughout the drawings and description.

The overall plan of operation of the apparatus of the present invention assumes that a previously fully ironed shirt is available and ready to be folded. In the modern high production laundry, the shirts are ironed by a crew of two or three operators who complete the ironing of the shirt, utilizing a multiple unit battery of presses, which may, for an example, include a one lay sleeve press, collar and cuff press, yoke press, bosom press or such other combination of presses as may be available. There is little or no hand finishing.

The fully ironed shirt is then hung on the collar form and the collar and shirt front are buttoned. However, the cuffs of negligee shirts are usually left flat (unbuttoned), as are the cuffs of "French cuffs" shirts. The operator then folds the shirt and it is to this operation that the present invention is addressed.

Introduction

With reference to the drawings forming a part of this application, the shirt folding table generally designated 20 comprises a bottom casting frame 21 and top casting frame 22 situated thereon and connected thereto by any suitable means, in this instance bolts (not shown). Bottom casting frame 21 is provided with a peripheral skirt 23 of angle iron construction and rectangular plan configuration, and feet 24 by which it is supported. A transverse brace 23A joins each of the sides of skirt 23 around the lower edges thereof as shown in Figure 3.

The entire mechanism is enclosed in a housing 25 having removable front and back plates 26, removable side plates 30 (one only of each being illustrated) as shown best in Figure 1 and a folding table surface 31 as shown best in Figures 2 and 3. The front and back plates 26 and side plates 30 are usually bolted to generally upright members connecting the corners of the skirt 23 and the respective corners of surface 31, not shown.

The folding table surface 31 is supported upon top casting 22 at its rear edge and by a pair of braces 23B bolted as at 21A to the bottom casting frame and supporting the front edge thereof as shown in Figure 3. In addition, the generally upright braces or members (not shown) connecting the respective corners of the top surface 31 and skirt 23 may give additional support.

As shown in Figure 2, the folding table surface 31 is provided with a rectangular depression or recess 32 in which a stack of flexible paper shirt retaining bands is to be placed. The paper bands are of the self-adhering type consisting of paper having a tacky coating on the top side at the right end and a similar tacky coating on the bottom side at the left end. These tacky coatings are insufficiently tacky to cause adherence between a coated surface and an uncoated paper surface; hence, the bands can be stacked, but when two coated surfaces are brought together with minimum pressure, coherence will occur to lock the two ends together to form a band. The recess or depression 32 is low enough so that the bands are out of the way but conveniently located.

Also positioned on the folding surface 31 and at the rear thereof are five extending retaining members designated R1, R2, R3, R4 and R5.

Retaining members R1 and R5 comprise extensible sleeve rods, members R2 and R4 are non-extensible cuff holder band members. These retainers are all situated upon and retained by a common shaft 39 at the rear of the machine as will subsequently be explained. Also situated upon and retained by said common shaft is a size plate 35 performing the function subsequently to be described. It is positioned beneath retainers R2—R4 and secured for movement from the position of Figure 1 out of engagement with the surface 31 into the position shown in Figure 2 into engagement with surface 31 and over collar mold assembly 33. Size plate 35 has positioned on the top surface thereof a board holder or clip 36 which serves to retain the conventional shirt cardboard in abutment therewith as subsequently explained. Likewise, the retaining members R1 and R5 are movable from the position of Figures 1 and 3 into abutment with the surface 31 during the functioning of the machine. Retainers R2—R4 are similarly movable, but instead of engaging surface 31 will engage the upper surface of size plate 35. (Of course, during folding of a shirt, fabric will be interposed between the members as described further.)

Positioned at the center of the table surface 31 from left to right and a little behind a median line from front to rear is a recess or opening in which is seated a collar mold, assembly or island generally designated 33. It is provided upon a depressed platform 34 and substantially centrally positioned on surface 31.

At a suitable position, in this instance slightly to the right and to the rear of the collar mold assembly 33 is a rheostat 33A for controlling the temperature of the collar mold assembly which is heated to dry out residual moisture in the shirt collar. On either side of assembly 33 is a stud 29 which is of a size to penetrate a French cuff hole and on which a French cuff may be located during folding.

Positioned between retainers R4 and R5 and secured to the surface 31 is a box 37 having a top opening which serves merely to retain a plurality of cardboard or reinforcing collar bands which are inserted in the collar of a shirt after the cycle of the machine is complete but before it is removed from the machine.

Positioned as shown in Figure 2, between the collar mold assembly 33 and the front edge of surface 31 is a right band folder or sealer 40 and a left band folder 41, joined by two parallel center elastics 46. Adjacent the right and left band folders 40 and 41 are right and left side folders 42 and 43 each likewise having elastics 47. In operation left band folder 41 and left side folder 43 are joined to operate simultaneously, but right band folder 40 and right side folder 42 are separated to act individually, as later explained. A self-adhering tape or shirt band is placed during operation of the machine, one for each shirt, along the center line P—P and is brought up around the folded shirt as a final operation by the action of band folders 40 and 41, folder 41 being a band sealer.

Positioned at the forward edge of the table is a tail folder 44 which operates in elongated apertures or slots 45 as later explained.

*Initial or rest position*

The initial or rest position of the improved shirt folder is shown in Figure 1 and is as follows:

Retainers R1—R5 and the size plate 35 are in elevated position of about 50 degrees above the table surface 31 as shown in Figure 1. In this position retainers R2 and R4 which are rotationally free upon the common shaft 39 are maintained by cam action.

Retainer R3 and size plate 35 which are also free upon the shaft 39 are retained by spring action, as are retainers R1 and R5.

Thus, the retainers R1—R5 are in elevated position and the size plate 35 is likewise in elevated position and in engagement with the undersurface of band retainers R2—R4.

The tailfolder 44 is in the position of Figure 2 and the side folders 42 and 43 and the band folders 40 and 41 are flush with the surface 31 also as shown in Figure 1. Collar mold 33 is in expanded position. The rods 38 and 38' of retainers R1 and R5 respectively, are extended.

*Preliminary operations*

In the folding of a shirt, with the instant apparatus, there are certain preliminary manual operations and the remaining operations are automatic. The preliminary operations are as follows:

One of the self-sealing shirt bands is placed with its tacky side facing upwardly on the right side and so that folder or sealer 40 will back the tacky surface as it completes the fold of the band around the shirt.

The collar of the shirt to be folded is then buttoned and the shirt placed face downwardly on the surface 31 with the collar positioned around assembly 33. Assembly 33 comprises co-operating collar surfaces which when taken together form a retractible and expandable band or island, the periphery of which is perpendicular to depression 34 and surface 31. This periphery is contractible by the operator to permit the insertion of a collar downwardly around it with the collar in recess 34. An electrical heater assembly 276 is included in the collar island or mold so as to dry out any residual moisture in the collar and is controlled by rheostat 33A.

When it is desired to insert a collar over the mold or island assembly 33, the foot pedal 50 shown in Figures 1 and 3 is depressed.

Pedal 50 extends through an aperture in front plate 26 and is pivoted at 51 to the bottom casting 21. A link 52 is pivotally connected to pedal 50 and extends as shown best in Figure 3 to a pivot with crank 53. A collar form control rod 55 is provided with a clevis 56 at one end which is pivotally attached to bell crank 53 and with an identical clevis 57 at the other end which is attached to a second bell crank 60 pivoted at 61 to the collar mold assembly 33 for retraction of the hands thereof. The bands are normally spring biased to expanded position, by spring 59 and the pedal 50 works against this spring. The mold assembly forms no part of this invention per se and is adequately described in copending application Serial No. 400,258 to which reference is made; consequently, it will not be described in further detail.

The assembly 33 is in this fashion normally in expanded position and the depressing of the foot pedal 50 operates through the connecting linkage as shown in Figure 3 to retract it. The collar is then placed over the band formed by the mold and pressure released on the said foot pedal 50 so that the band expands to hold the shirt securely by the collar. The shirt sleeves are hung over the left and right sides of the machine. The shirt is then pulled forwardly over the front edge of surface 31 with the bottom of the button strip slightly overlapped. If necessary a crease is positioned in the back of the shirt depending upon the width. The front of the shirt is in communication with the surface 31 of the table. The size plate is moved from the position of Figure 1 to the position of Figure 3, into engagement with the surface 31 with the fabric of the shirt therebetween. The size plate is a generally rectangular plate provided with a cutout 65 at the forward edge thereof so that the shirt cardboard which is the same width dimension as the size plate, and has a length dimension extending from the clip 36 to the front edge thereof may readily be positioned under the clip 36. This is done at this time.

The size plate 35 is provided with a pair of spaced front to rear stiffening depressions forming and projecting near ribs 35'. Secured at each side edge on flange extensions 65', at the rear of the size plate 35 is a flanged channel member which by cooperation with the top surface of the flanges 65' forms a rectangular sleeve 66. With reference to Figures 2 and 9 the left sleeve 66 is secured to a member 70 and the right sleeve secured to a member 71. Each of members 70 and 71 includes a forwardly projecting arm 69 positioned in the sleeve and having spaced threaded apertures 69'.

Each of the sleeves 66 has an aperture in which may be positioned a cap screw, as at 70' and 71', so that the arms of members 70 and 71 can be adjustably mounted in sleeves 66 for relative adjustment of the size plate 35 forwardly and rearwardly of the front edge of table surface 31. The members 70 and 71 are shown in Figures 4 and 9.

Members 70 and 71 are plate supporting arms; each comprises a forwardly extending portion 69 received in sleeve 66, rearwardly extending portion 72 providing a hook and a central portion 73 positioned upon the common shaft 39. Each of members 70 and 71 is retained loosely upon the shaft 39 by a collar 74 and a second collar spacer 75. Collar spacers 75 maybe free to rotate upon shaft 39 but collars 74 are secured thereto by the set screws 76 which project therefrom and are adapted to engage respective lugs 80 extending from members 70 and 71.

To end 72 of member 71 is secured a spring 81, the other end of which is secured to a pin 82 on the follower arm for retainer R4 as subsequently explained (Figure 5). The member 70 is likewise so positioned with the exception that its spring 81 is secured to the follower arm for retainer R2. Since the lugs 80 engage screws 76 and members 70 and 71 would be biased in a clockwise direction with reference to Figure 9 by action of springs 81, there is a bias imparted by lugs 80 on screws 76 and consequently to the common shaft 39.

When the size plate 35 is moved from the position of Figure 1 into engagement with the table it is moved manually against the bias of springs 81, hence, such bias is relieved against screws 76 and consequently on common shaft 39 and this shaft then moves under tension of toggle return spring 79 which has a tension slightly less than that of springs 81 and consequently retainers R1 and R5 affixed to the shaft 39 likewise move into engagement with the table surface with the fabric therebetween.

As shown in Figure 10, the toggle return spring 79 is connected near the pivot of links 79A and 79B; link 79B being pivoted to collar mold assembly 33, link 79A being pivoted to link 79B and to link 78, and link 78 being fixed to common shaft 39. It will be seen as the toggle comprised of link 79A and link 79B approaches the full line position of Figure 10 tension is exerted by spring 79 which will over balance the tension of springs 81 when the toggle is in this position, but not when the toggle is in the broken line position of Figure 10. Thus as the size plate is moved from the position of Figure 1 into engagement of the table, it will take effort initially to overcome the tension of springs 81, but when brought into engagement with the table it will remain there by tension of spring 79. Spring 205 for sprocket 204 likewise assists toggle 79A, 79B as it approaches the position of Figure 10, later explained.

The shirt cuffs are then brought over the rods of retainer R1 and R5 and the cuffs are positioned on the center of the size plate over the shirt board. With long sleeve shirts, a cuff may project beyond the size plate in a direction opposite to the retainer over which it is folded and may be permitted to remain as it will automatically fold into position by operation of the side folders. If French cuff shirts are to be folded, the cuff holes are placed over studs or pins 29 so the sleeves are in crisscross fashion.

The retainer R3 or cuff holder band member is then brought down on the cuffs. Retainer R3 is loose upon shaft 39 and comprises a member 85 to which is secured band 86, band 86 being a flat member and having a downwardly directed channel 90 formed at the inner end thereof in which the end of member 85 is positioned and secured thereto by a screw penetrating band 86 and member 85. Each of the bands 86 for retainers R3—R4 is identical, and are in the nature of spatulas, having a flat textured surface so as to provide frictional engagement with the shirt fabric, and a channel portion 90 directed downwardly and seated over its respective member, in this instance member 85. Band 86A for retainer R2 (Figure 2) is substantially the same except that it has a greater width which is provided by an extending edge extending in the direction of retainer R3 as shown in Figure 2. This is to insure that the folded portion of the shirt folded by side folder 42 will be securely engaged by retainer R2 after it has elevated and returned to engagement with the shirt fabric in sequence.

Member 85 is seated loosely upon the shaft 39 and is provided with a forwardly projecting portion 91 having a roller 92 journalled thereto which serves to engage the detent member 93 having a turned hook portion 94 in which the roller is adapted to seat when the retainer R3 is in the position of Figure 1. Detent 93 is (Figures 3 and 8) pivoted at 95 to a supporting bracket 96 secured to the top casting 22 and also serving to support a safety switch 290. Detent 93 is biased to the position of Figure 3 by a spring 101 connected to the bottom end thereof and to the collar mold assembly (Figure 1).

Thus when retainer R3 is in the position of Figure 1, roller 92 is retained in the hook portion 94 of detent 93 by the bias of spring 101. As the retainer R3 is pulled from the position of Figure 1 into engagement with the shirt fabric on the table, roller 92 rolls out of hook portion 94 of detent 93 and into engagement with the stem of the detent 93 and spring 101 acts as roller 92 reaches the horizontal to further force it downwardly into the position of Figure 3 and retain it in that position. Arm 85 with portion 91 is retained on shaft 39 between link 78 and collar 77 (Figure 4). The arm portion of detent 93 serves to operate against a conventional safety switch 290 in conjunction with starter switch 291, as hereinafter described.

Automatic operations

The remainder of the functions of the machine are automatic and occur in the following sequence when the machine is actuated.

As the automatic cycle is actuated, the tailfolder 44, hereinafter described, starts coming up and forward folding the shirt tail over rods 38 and 38' and size plate 35. Retainers R2 and R4 start coming down over the tailfolder to move into engagement therewith. (Specific sequence movement in response to cam movement is shown in Figure 13 and will be discussed later.) Rods 38 and 38' for retainers R1 and R5 respectively begin to retract. The tailfolder returns to rest position after the time that rods 38 and 38' are completely retracted. Retainer R2 lifts and the right side folder 42 simultaneously commences to come up. The right side folder 42 comes over to fold the right side of the shirt over retainer R4. Retainer R2 then descends again into communication with the shirt fabric to hold the folded right side, and the right side folder 42 retracts. As it retracts completely, the left band folder 41 and left side folder 43 come over and into engagement with the shirt and dwells. The right band folder or sealer 40 then snaps over to seal the band, and the collar mold contracts. The retainers R1 and R5 commence to elevate with the rods completely retracted and as they reach rest position or initial elevational height, the left side folder 43 and left band folder 41 retract. Retainers R2 and R4 are of course cam elevated, and consequently hold the plate 35 and retainers R3 down until the cam has allowed them to elevate. Thus size plate 35 and retainer R3 elevate with retainers R2 and R4. At this time the rods for retainers R1 and R5 extend. These rods 38 and 38' for retainers R1 and R5 are bowed and move in slots and when fully extended are at the center of plugs 185 (Figure 11) but as they retract they progress toward the cooperating inside edges thereof in their respective slots. The automatic stop switch 300 then stops the machine after one cycle. A collar stiffener cardboard is removed from box 37, inserted in the shirt collar, the shirt removed from size plate 35 and the machine is in position to commence another cycle.

This automatic folding operation is entirely mechanically actuated from cams on a motor driven shaft. The cam shaft and cams make one cycle of folding motions for each complete revolution and come to rest at a stopping position. An electric motor 120 drives the cam shaft and will be further explained hereafter. It is provided with a chain drive 121 driven by a sprocket 122 connected to a reduction gearing 123, through an overload clutch 127 to motor 120. The overload clutch 127 is provided to disengage whenever the automatic mechanism misfunctions and jams so as to prevent damage to the machine and garments being folded. As mentioned, the cam shaft stops at a certain position which marks the end of the folding operation and is also in the ready position for the next cycle, all as illustrated in Figure 3. The chain drive 121 serves to drive sprocket 124 affixed to a cam shaft 125. Cam shaft 125 is supported as shown in Figures 3 and 7 by a pair of bearing blocks 126, secured to casting 22. A second pair of bearing blocks 130 is secured to the casting 22 and is positioned thereabove as shown in Figure 3 and serves to support the follower shaft 131 on which is positioned a plurality of followers for cooperation with respective cams on cam shaft 125. Blocks 126 and 130 are attached to the upper casting 22 by any suitable means, as shown in Figure 3 and provide bearings for shafts 125 and 131.

Affixed to the shaft 125 for rotation therewith is a plurality of cams 135-140, Figure 7, the individual operation of which will be more fully explained later. Each of the cams is provided with a follower as shown in Figures 5 and 6, which followers are shown diagrammatically with reference to Figure 12. When the shirt folding table has completed one cycle of operation and is in the rest position, the cams 135-140 and the followers 135A-140A are in the position shown in Figure 12.

As the cam shaft 125 commences to rotate, each of the cams 135-140 will rotate in the direction of the arrows of Figure 12 from its initial or rest position, and the shaft rotation continues through one complete cycle until the shaft halts in the same position. These cam and associated structure movements will now be described in greater detail.

Tailfolder up and forward

Rotation of cam 139 will first cause the tailfolder 44 to move upwardly and forwardly by the displacement of cam follower 139A (Figure 12). At this time, it may be mentioned that each one of the cam followers 139A-140A is provided with a follower arm pivoted about shaft 131, all of which are substantially similar, and will not therefore be further explained other than with reference to follower arm 141, except in the instance of slight differentiating features. It will be understood, however, that the cam followers operate various mechanical movements requisite to the shirt folding sequence as explained.

To the extending end of follower arm 141 there is attached a rod 142 having a clevis 143 at each end thereof. One of the clevises is pivotally attached with respect to arm 141 and the other is pivotally attached with respect to tailfolder rocker arm or tailfolder drive lever 144. Lever 144 is attached to a rod 145 supported in a pair of bearings 146 secured to a pair of depending members 150 secured one on either side of the table surface 31 as shown and illustrated by the one side appearing in Figure 3. At either end of the rod adjacent members 150 is secured a tailfolder driven lever 151 which has pivoted thereto tailfolder roller arm 152 supporting the tailfolder roller 153. A cam follower roller 154 is provided for each arm 152 as shown in Figure 3 and is adapted to engage the undersurface of a pair of spaced cams or tailfolder guides 155 bolted to depend from the surface 31 adjacent the front end thereof at either side in the same manner as is shown on the one side in Figure 3.

As cam 139 moves the follower 139A, the tailfolder, through the mechanical linkage, is moved quickly upward and forward. A tailfolder tension spring 160 serves to connect the bottom corner of each one of the members 150 to the bottom of respective member 152 to retain roller 154 in communication with the surface of cams 155 and in the rest position of Figure 1.

A spring 161 secured to drive lever 144 serves to bias it to the position of Figure 3 and so bias the follower 139A in communication with cam 139.

R2 and R4 down on tailfolder roller

Rotation of cam 135 will next cause retainers R2 and R4 to move from the elevated position of Figure 1 into contact with the fabric of the shirt on the tailfolder as the tailfolder moves upwardly and forwardly. Cam 135 is provided with a roller 135B for actuating follower arm 162 in addition to the actuation of follower arm 163 by cam 135. Arm 162 is pivoted to shaft 131 and is retained thereon at one side by a collar 164 and on the other side by arm 163. Arm 162 has a forward extension 165 adapted to be engaged by roller 135B for elevating retainer R2 singly and in sequence as later explained. Secured to follower arm 162 at the rear thereof is a rod 166 pivoted to member 167 for retainer R2 situated loosely upon shaft 39 so that as the forward extension 165 of the follower 162 is depressed, retainer R2 will move in the direction of surface 31, and as the forward extension 165 is elevated it will elevate retainer R2. Also secured to follower 162 at the rear is an extending lug 170 to which is secured the spring 81 for member 70 of size plate 35, as described.

Follower arm 163 comprises a forward extension 171 supporting the follower 135A having a collar portion 177 loose on shaft 131 and a rear extension 172 supporting a flat bar 173 parallel to shaft 131 and having an extending end 174. To the other end of the bar 173 is secured a second spaced extension 175 having a collar portion 176, loose on shaft 131 and spaced with reference to the first collar portion 177. To member 175 is attached a rod 176 similar to rod 166 which is connected to member 168 of retainer R4. A lug 170 is provided to which is attached a spring 81 for the other member 71 of size plate 35, as described.

Thus it will be seen that the roller 135B of cam 135A may engage extension 165 to lift it and elevate retainer R2 independently of retainer R4, but when follower 135A is elevated, both retainers R2 and R4 will be elevated. Likewise, when follower 135A is permitted to depress and roller 135B does not engage extension 165, both retainers R2 and R4 will move in the direction of surface 31 by the bias of springs 81.

Tailfolder back and down

After the retainers R2 and R4 have moved into contact with the fabric on the tailfolder, and the tailfolder has reached its forward limit position to complete the transverse fold in the shirt, cam 139 will permit follower 139A and arm 141 under bias of spring 161 gradually to depress and the tailfolder will return to the position of Figure 1.

Rods for retainers R1 and R5 retract

Retainers R1 and R5 as shown in Figures 1 and 11 each comprise sleeve rod 38 and 38', respectively, joined to a rack 180 at one end thereof. Each of the rods 38 and 38' is bowed inwardly slightly with reference to Figure 1 so that its tip is one or two degrees off of linear extension in an inward direction toward the center of the table. This is done to provide a shirt fold assuming somewhat of the normal contour of a shirt and to provide for easy release of the shirt from the rods as they are withdrawn into their housings 181. Each of the rods is provided with a housing generally designated 181 comprising a rearward tubular extension 182, a forward tubular extension 183. Forward tubular extension 182 is closed by a plug 185 having an aperture 187 therein for the penetration of rods 38 and 38', the aperture being elongated to extend from the center of the plug inwardly toward the center of the table as shown in Figures 2 and 11. This is, of course, to permit the contraction of the bowed rods 38 and 38' without bending.

The center portion of each housing 181 is hollow and at the bottom thereof is provided slots or apertures 184 as will be seen best with reference to Figures 3 and 11, and the racks 180, meshed with gears 191 reciprocate therein. As shown in Figure 11, when the gear 191 rotates in a counterclockwise direction the rod 38 will be retracted within cylinder 183 and when the gear 191 rotates in a clockwise direction it will be extended.

Rotation of cam 140 through follower 140A and follower arm 200 positioned by collars 201 and 202 on shaft 131 through flexible chain 203 connected to rear of arm 200 rotates a sprocket 204 keyed to inner shaft 192 positioned within hollow shaft 39. A chain 203 is passed over the sprocket 204 and is secured at its other end to a spring 205 secured to the base casting 21 at 205A. In Figure 11 it is shown in its retracted position.

The center portion of housing 181 also has a depending portion 190 forming a sleeve which is fixed to common shaft 39. As shaft 39 rotates so will housings 181. Spur gears 191 are secured to shaft 192; one is associated with each of retainers R1 and R5, and penetrates respective housing 181 for engagement with the respective rack 180. The two gears 191 are fixed to the ends of the shaft 192 which is fitted within the common tubular shaft 39. Gear 191 for retainer R5 is joined to sprocket 204 for rotation therewith and gear 191 for retainer R1 is joined to pawl 207 for rotation therewith.

Thus rotation of sprocket 204 rotates spur gears 191 for retainers R1 and R5. Since each of the spur gears 191 communicates with the rack of its respective retainer, elevation of follower 140A by cam 140 will rotate sprocket 204 in a clockwise direction with reference to Figure 5 to racks and the rods for retainers R1 and R5. Elevation of follower 140A now serves to retract rods 38 and 38' for R1 and R5.

Secured to housing 190 for retainer R1 is a lug or pin 206 projecting in the direction of associated gear 191 to be engaged by elevating pawl 207. Pawl 207 is fixed to shaft 192 and gear 191 of retainer R1 for rotation therewith. Thus rotation of gear 191 for retainer R1 in a clockwise direction with reference to Figure 5 will first retract the racks 181 and rods 38 and 38' are so positioned that upon retraction of rod 38 pawl 207 will engage lug 206 and consequently elevate retainer R1 and thus through the common shaft 39 elevate retainer R5 as well.

Thus at the end of the cycle, retainers R1 and R5 are elevated by action of pawl 207 engaging lug 206 after rods 38 and 38' have been retracted. At this time gears 191 only move sufficiently by action of sprocket 204 through cam 140 to retract rods 38 and 38'.

Retainer R2 elevates

Retainer R2 is elevated by lug 135B to allow the right side folder 42 to fold the right side of the shirt over retainer R4. This is accomplished by rotation of cam 135 which carries with it the roller or lug 135B which moves into engagement with forward extension 165 to elevate it and through arm 162 and control rod 166 elevates retainer R2. At this time retainer R4 remains in engagement with the shirt fabric by the bias of spring 81 attached to member 71.

Right side folder over

When retainer R2 is elevated cam 138 actuates follower 138A which through appropriate connections moves right side folder 42 to fold the right portion of shirt over retainer R4 and over the size plate 35 so that it may be engaged by retainer R2 as R2 again descends into communication with the table. The side folder of this invention is substantially identical with the side folder disclosed in copending application Serial No. 400,258 and the description therein is adopted herein by reference. It will not be further explained as it forms no part of this invention per se.

Retainer R2 depresses

After side folder 42 has folded over its respective shirt portion, retainer R2 depresses into engagement with the shirt fabric, the fabric overhanging side folder 42 slightly to permit this. The depression of retainer R2 is accomplished by tension of its respective spring 81 as movement of cam 135B passes engagement with extension 165, elevation of arm 162 and depression of retainer R2.

Right side folder back

At this time the further rotation of cam 138 moves the right side folder 42 back to the position of Figure 1. The cam actuation of the right side folder 42 will further be explained with reference to the cam layout subsequently.

Left side folder and left band folder over

Cam 136 operates to move the left side folder 43 and left band folder 41 over to fold the left side of the shirt over the already folded right side of the shirt and to bring the left portion of the paper band around the shirt, again as explained with reference to Serial No. 400,258. In this position they dwell momentarily.

Right band folder over

The right band folder or sealer then is actuated by cam 137, and carries with it the tacky portion of the right portion of the paper band into communication with the tacky portion of the left portion of the band and seals the band around the shirt. This is also shown in Serial No. 400,258.

Collar mold contracts

The engagement of collar mold lug 137B on cam 137 engages follower arm 58 pivoted to casting 22 to engage roller 137C to depress the follower arm 58 which engages stop 57 on rod 55 to contract the collar mold identically to its contraction when pedal 50 is depressed.

The collar mold stays contracted until size plate 35 has elevated sufficiently to remove the shirt collar therefrom.

Left side folder, left band folder and right band folder

Next the cams 136 and 137 permit the left side folder, left band folder and right band folder to move back into the position of Figure 1.

Retainers R1 and R5 elevate

Cam 140 then further elevates follower 140A which depresses arm 200 further, rotates sprocket 204 in a clockwise direction with reference to Figure 5 so that pawl 207 engages stud 206 and elevates retainers R1 and R5 in their retracted condition. Since the housings 190 of retainers R1 and R5 are fixed to the common shaft 39, shaft 39 rotates the same clockwise, releasing bias on studs 80 and breaking the toggle 79A—79B. After the retainers R1 and R5 are elevated, the cam 140 permits sprocket 204 to rotate counterclockwise under the tension of spring 205 to extend rods 38 and 38' and to engage pawl 207 with stud 206 in the reverse direction so that spring 205 assists toggle 79A—79B in overcoming the tension of springs 81 as the size plate 35 is moved to table engaging position.

Retainers R2—R4 and size plate up

Further action of cam 135 elevates retainers R2 and R4 by the action of springs 81 upon size plate 35 and by the engagement of retainer R3 with the top surface of the size plate moves size plate 35 and retainer R3 upwardly to rest position. It is necessary to retain retainers R2 and R4 so that both the action of toggle 79A—79B and spring 205 overcome the tension of springs 81.

The table then stops automatically by action of automatic stop switch 300, a microswitch engaged by lug 140B of cam which breaks the circuit as will be explained by reference to the wiring diagram.

Cam sequence

In Figure 13 there is shown a chart depicting the developed plan of the several cams 135—140, by which the various motions of the folding sequence are obtained. In this figure the cams 135—140 are shown positioned in succession, each one above the other. The line at the base of the figure and under each cam is a datum position for the cam above it, and represents a radial dimension on the cam which is lower than the lowest spot on the cam. The start position is shown at the left side of Figure 13 and operation proceeds to stop position on the right side of the figure. The stop position is the start position of the next cycle.

The base line represents one full turn of the cams (and shaft 125), that is, 360 degrees, and for convenience it is divided into ten positions numbered 0 to 10. Space between successive divisions represents 36 degrees each of cam movement. The chart, Figure 13, depicts the automatic operations which follow the manual operations of the folding sequence. Each cam will now be explained individually with reference to Figure 13.

Fold control cam 135. This cam controls retainers R2 and R4 and at the start of the cycle these cams are in rest position of 50 degrees above the table surface. At the point 221 on cam surface 135 retainers R1 and R2 start moving downward to make contact with tailfolder roller 44. At 225 the retainers have completed their downward travel and are in communication with the tailfolder roller 44. At 245 the retainers R1 and R5 start to raise and at 250 the retainers R2 and R4 are up to rest or initial position completing the cycle.

Fold control lug or roller 135B. This controls the single elevation of retainer R2. At 226 retainer R2 starts to rise and 228 is at its greatest height so that the right side folder 42 folds the shirt such that a loose portion thereof is positioned beneath the retainer R2. At 230 retainer R2 drops quickly into communication therewith and at 232 has completed its cycle of individual operation.

Left fold cam 136. This cam controls the left side folder and left band folder. At 234 they start to rise in unison, at 236 they have completed the fold and dwell from 236 to 241 to allow the sealer 40 to make the seal, at 241 they start to return and at 246 complete the cycle.

Sealer cam 137. This is the sealer or right band folder 40. At 237 the right band folder starts to rise, at 239 it has brought the right end of the paper band in communication with the left end thereof, holding and sealing the paper band while the left folder starts to return. At 242 it starts to return and at 247 completes the cycle.

Collar mold lug 137B. At 240 this lug makes contact with the cam follower 137C and starts to retract the collar mold. At 240 this lug makes contact with the cam follower 137C and starts to retract the collar mold. At 243 the collar mold is completely retracted. At 248 the collar mold starts to open and is completely opened at 251 as the cycle is completed.

Right fold cam 138. At 227 the right fold cam starts its operation; at 231 it has completed its fold. At 223 it starts to return and at 235 the cycle is completed.

Tailfolder cam 139. At 220 the tailfolder starts its upward and forward motion. At 223 it reaches its most forward position and immediately starts to return, completely returning at 229 and completing the cycle.

Sleeve control cam 140. This controls retainers R1 and R5. At 222 the rods for R1 and R5 start up and at 224 the elevating pawl 207 is revolved to almost touch stop pin 206, raising the housings 190. At 244 the housings are at their highest point. At this point the rods 38 and 38' begin to extend and at 249 the rods are completely extended. At 252 there is a drop-off in the cam to 253 to enable the operator to pull the housings 190 manually into contact with the surface 31. At this drop-off the pawls 207 are rotated slightly away from pins 206.

Circuitry

In Figure 14 is shown a straight line diagram of the electric wiring for the motor drive, lights, heater and controls.

The table top or surface 31 is perforated at several places with small holes and in addition openings are provided through which the various folding elements extend. One or more lights 275 are mounted below the surface 31 and the lights shining up helps illuminate the shirt and thus assist the operator in getting out any wrinkles in the shirt front, which is lowermost when initially placed on the table preparatory to the folding operation. The lights 275 also illuminate the mechanism for servicing. In addition the collar mold assembly 33 is provided with a heater 276 for drying out any residual moisture that may remain in the collar. This heater is mounted centrally within the collar mold assembly 33.

The circuits include power lines L1 and L2 which are fused at 280 and connected to an on-off control or master switch 281 to supply busses 282 and 283. Light 275 is connected directly across busses 282—283 and hence is energized whenever the switch 281 is closed and de-energized whenever the switch 281 is opened. Likewise, heater 276 is so connected in series with rheostat 283 therefor and is correspondingly energized and de-energized.

When switch 281 is closed, a circuit extends from junction 285 (on buss 282) to coil 285A or relay 285 and thence through junction 286 and a normally closed safety switch 290, thence through a normally open starting switch 291 via lines 292, 293, and 294 to junction 295 on buss 283.

Thus, when the switch 290 is closed by disengagement with portion 91 of member 85 and start switch 291 is pressed to actuate the machine, a circuit is established which energizes relay 285 and closes its three normally opened contacts 285B, 285C and 285D. Closure of contacts 285B establishes a circuit from juncture 286 via line 296 to a normally closed automatic stop switch 300 and thence via line 301 to buss 283. This establishes a holding circuit when the automatic stop switch 300 is closed by disengagement with lug 145B on cam 145 since the emergency stop switch 302 is in its normally closed position. Hence the relay 285A remains energized until either the emergency stop switch 302 is actuated or the automatic stop switch 300 is actuated at the end of the cycle by engagement with lug 145B and thus being opened automatically at the stop or zero position, one time for each turn of shaft 125.

The contacts 285C and 285D control motor 120. Thus, a circuit extends from junction 304 on buss 282 through contacts 285D to motor 120 thence through contacts 285C and via line 305 to junction 306 on buss 283. Hence, motor 120 drives through clutch and gear unit 123, 127 to rotate sprocket 122 and through chain 121 to turn shaft 125.

The member 145B is positioned so as to engage the roller of automatic stop microswitch 300 to open the contacts when the shaft 125 has come to the completion of one turn, for one cycle of folding movements, thus switch 300 is opened, the holding circuit to relay 285 is de-energized and its contacts opened and motor 120 and hence all mechanisms driven by it come to a stop. Likewise, if emergency stop switch 302 is actuated, the same action takes place. The safety switch 290 precludes the energization of any circuit by actuation of start switch 291 until its contacts have been closed by disengagement of its roller by portion 91 and member 85, as retainer R3 is moved in engagement with surface 31.

It is apparent that many modifications and variations of this invention as hereinbefore set forth may be made without departing from the spirit and scope thereof. The specific embodiments described are given by way of example only and the invention is limited only by the terms of the appended claims.

What is claimed:

1. In combination, a machine frame having thereon a work surface, means on the frame for retaining an article on said surface, folding means on the frame for folding said article about said retaining means, said retaining means including at least one extensible elongated member, an elongated housing on the frame into which said extensible member is partially retractable, said member including portions that are retractable such that they remain in the same horizontal plane that they were located in in their extended position, and means for retracting said member into said housing.

2. The structure of claim 1 in which said retractible elongated member has a rack thereon, and means mounted on the frame for engaging said rack for translation of said elongated member.

3. The structure of claim 2 in which said housing is mounted on the frame so as to be movable from a first to a second position and cooperating means is provided on the frame and connected to said housing for moving said housing from one position to the other.

4. In combination, a machine frame having a work surface thereon, retaining means mounted on said frame for retaining an article on said surface, folding means mounted on said frame for folding said article about the retaining means, said retaining means including a plurality of extensible-retractable elongated members, each of said elongated members being mounted in an elongated housing and connected therewith for extension and retraction relative to said housing, a common shaft on the frame on which the housings are mounted, rotary means on the machine for engaging a portion of each of said elongated members and secured to the common shaft whereby rotation of said common shaft will translate said members in unison.

5. The subcombination of a garment retaining means, including a hollow elongated housing, said elongated housing having a forward end and a rearward end, an elongated rod mounted for sliding movement in said housing, said housing being open at its forward end for translation of said elongated rod therethrough, a rack member connected to the rearward end of the elongated rod for actuating said elongated rod, means for mounting said housing for rotation about a horizontal axis, and gear means mounted so as to engage said rack member for extending and retracting said rod.

6. The structure of claim 5 further characterized in that the opening in the forward end of the housing is an elongated aperture having a major axis that extends in a horizontal direction and that said elongated rod is slightly bowed.

7. A shirt folding table having a frame on which two of the subcombinations of claim 6 are mounted in spaced relationship on said frame, said subcombinations being mounted to have their respective rods bowed outwardly and oppositely to each other.

8. In combination, a machine frame having a work surface thereon, a common shaft mounted on the frame adjacent said surface, elongated retaining means mounted on the shaft for retaining an article on said surface, said retaining means comprising a first, a second, and a third flexible means, all of which are operable in side by side relationship, have forward end portions, and are retained on said common shaft in positions such that the said forward end portions of said retaining means are normally positioned in an elevated datum position in relation to said surface and are movable toward said surface for engagement therewith, operator means for moving the first flexible means in unison with the second flexible means into engagement with said surface, second operator means for moving the third retaining means closely adjacent to said surface and third operator means for returning said second retaining means individually and said first and third retaining means in unison to datum position in sequence.

9. The structure of claim 8 in which said first retaining means in part consists of a plate, said second retaining means comprises a pair of spaced extensible and retractible members and said third retaining means comprises an elongated flexible member positioned over said plate.

10. The structure of claim 9 further characterized by a fourth retaining means connected to the frame, said fourth retaining means comprising a second pair of spaced flexible members mounted for movement from a position in spaced relation to said plate to a position to bear against said plate and one on either side of said third retaining means.

11. The structure of claim 9 further characterized in that a fourth retaining means is connected to the frame for operation between a position spaced above said planar member to a lowered position to retain a portion of the article in position over said plate.

12. In a machine for folding an article comprising in combination a frame having a work surface thereon, first, second, and third retaining means mounted on the frame for movement with respect to said surface for retaining said article on said surface, folding means for folding said article about said first, second, and third means, operating means mounted on the frame and connected to said retaining means for actuating said first, second, and third retaining means and said folding means, whereby said first, second, and third retaining means are movable from an index position to an article engaging position, the improvement comprising mounting the aforementioned retaining means whereby said first, second, and third retaining means may be individually moved into engagement with the surface in sequence but are simultaneously returned to index position.

13. The structure of claim 11 further characterized in that said first means in part consists of a plate, said second means comprises a pair of spaced flexible members and said third means comprises a center flexible member.

14. A machine for folding shirts comprising in combination a frame having thereon a retaining surface, means on the frame for retaining a shirt on said surface, folding means on the frame for folding a shirt about said retaining means, means mounted on the frame for operating said folding means and said retaining means, said retaining means including a common shaft mounted on the frame, a plurality of elongated members rotatably mounted in side by side relationship on said shaft, the outermost of said elongated members on the shaft being extensible and retractable, the elongated members intermediate the outermost members being non-extensible, and means on the frame connected to the outermost elongated members for extending and retracting said outermost members in unison.

15. The apparatus of claim 14 further characterized in that the retaining means includes a housing on the frame for each of said extensible and retractible members within each of said extensible and retractable means having a rack portion reciprocably mounted, a housing, gear means connected for reciprocating said racks in unison and said housings are connected for elevation and depression in unison.

16. The structure of claim 14 in which said non-extensible members are mounted loosely upon a common shaft, said extensible members being fixed thereto.

17. In a folding machine having a supporting surface on said frame, said surface having a front edge from which the machine is normally operated and a rear edge, an elongated housing, an elongated member extensible and retractible within said housing, said housing being pivotally mounted adjacent said rear edge of said surface whereby said elongated member normally extends forwardly over the surface and means is mounted on said frame for engaging said elongated member whereby said elongated member may be retracted so as, in part, to overhang said rear edge of the machine.

18. In a folding machine having a frame having a folding surface thereon providing an edge adjacent the operator and an edge remote therefrom, the improvement comprising a pair of spaced extensible and retractible retaining members mounted on the frame, a retaining plate on the frame mounted so as to be positioned between said pair of spaced members and substantially centrally of said surface, a pair of fixed retaining members mounted on the frame so as to be positioned over said surface and a central retaining member also positioned between said pair of fixed retaining members.

19. The structure of claim 18 in which all of said members are positioned upon a common shaft which is mounted on the frame at said remote edge.

20. The structure of claim 18 further characterized in that there is provided spring means connected to the retaining plate for normally retaining said retaining plate in an elevated position.

21. The structure of claim 18 further characterized in that an electrically operated motor means is mounted on the frame for operating said retaining members and a switch is provided on the frame and positioned so as to be engageable by said central retaining member when in an elevated position precluding operation of the motor means and for causing operation thereof when said retaining member is brought into engagement with said surface.

22. The structure of claim 18 further characterized in that resilient means is provided for maintaining said central member in elevated position but is operable as said central member is rotated in the direction toward the table to bias said central member into engagement with the table.

23. The structure of claim 18 further characterized in that first spring means is provided on the frame for biasing said retaining plate and said extensible and retractible members into elevated position and second spring means is provided on the frame and operable as either said extensible and retractible members or said retaining plate are moved into communication with the table surface to retain these members in communication with the table surface.

References Cited in the file of this patent
UNITED STATES PATENTS

| 698,562 | Schuneman | Apr. 29, 1902 |
| 2,737,765 | Reid | Mar. 13, 1956 |
| 2,758,761 | Isaacson | Aug. 14, 1956 |